(12) United States Patent
Liu

(10) Patent No.: US 8,752,764 B2
(45) Date of Patent: Jun. 17, 2014

(54) SYSTEM FOR ELECTRONICALLY SEALING AN ITEM AND VERIFYING THE AUTHENTICITY OF THE ITEM SEALED

(76) Inventor: Jianmin Liu, Dundas (AU)

( * ) Notice: Subject to any disclaimer, the term of this patent is extended or adjusted under 35 U.S.C. 154(b) by 264 days.

(21) Appl. No.: 13/211,380

(22) Filed: Aug. 17, 2011

(65) Prior Publication Data

US 2012/0043383 A1 Feb. 23, 2012

Related U.S. Application Data

(60) Provisional application No. 61/374,643, filed on Aug. 18, 2010.

(51) Int. Cl.
*G06K 7/06* (2006.01)

(52) U.S. Cl.
USPC ............................. 235/441; 235/492; 235/486

(58) Field of Classification Search
USPC .................................. 235/441, 485, 492, 486
See application file for complete search history.

(56) References Cited

U.S. PATENT DOCUMENTS

| 6,226,619 | B1 | 5/2001 | Halperin et al. |
| 7,061,382 | B2 | 6/2006 | Claessens et al. |
| 2007/0013521 | A1 | 1/2007 | Lindsay et al. |
| 2008/0069736 | A1 | 3/2008 | Mingerink et al. |
| 2010/0155489 | A1* | 6/2010 | Chang ............................ 235/486 |
| 2010/0201393 | A1* | 8/2010 | Quercia et al. ................ 324/763 |

FOREIGN PATENT DOCUMENTS

| CN | 98112966 | 3/2000 |
| CN | 99248507 | 3/2000 |
| CN | 200410000625 | 7/2005 |
| CN | 200510200157 | 8/2005 |
| CN | 200520064539 | 9/2005 |
| CN | 200720069297 | 4/2007 |
| GB | 2450940 A | 1/2009 |

* cited by examiner

*Primary Examiner* — Steven S Paik
*Assistant Examiner* — Sonji Johnson
(74) *Attorney, Agent, or Firm* — James M. Wu; JW Law Group

(57) ABSTRACT

A system includes an apparatus for identifying an item with inclusion of a contact smart card to store the authenticity information of the item, and a card reader to allow examination of the authenticity being conducted locally and/or remotely. The identifying apparatus further has a locking means and a disabling means. The locking means prevents normal use of the item in a locked position. The disabling means will disable the contact smart card when the locking means is unlocked. The identifying apparatus further has a releasing means to be engaged with the locking means and disabling means. The card reader includes a central operating unit, an interface to the contact smart card, an interface to an external device and an interface to users. The interface to the contact smart card includes an adaptor of contact smart card and a fastening means to secure the identifying apparatus.

20 Claims, 13 Drawing Sheets

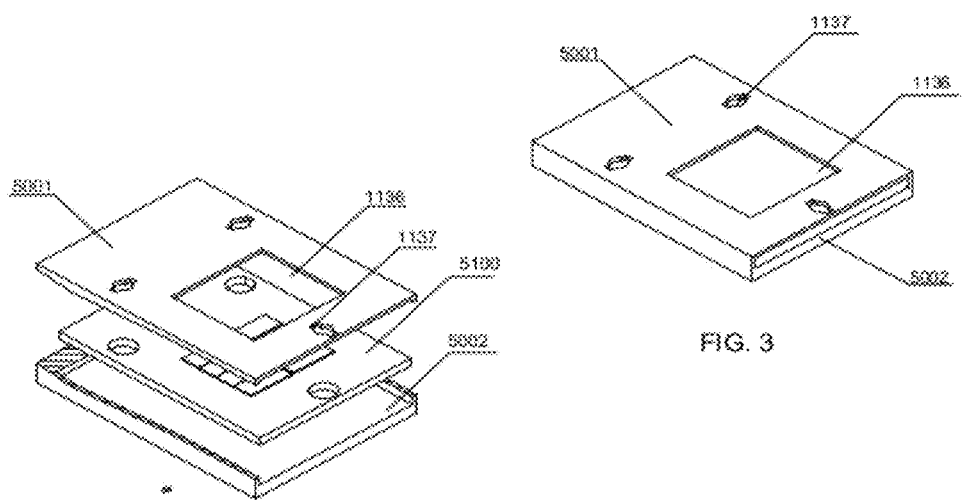
FIG. 2
FIG. 3
FIG. 4
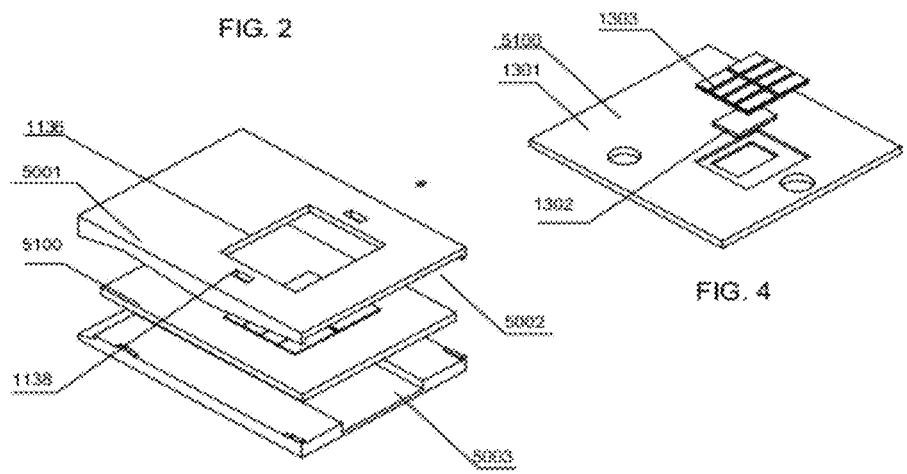
FIG. 5
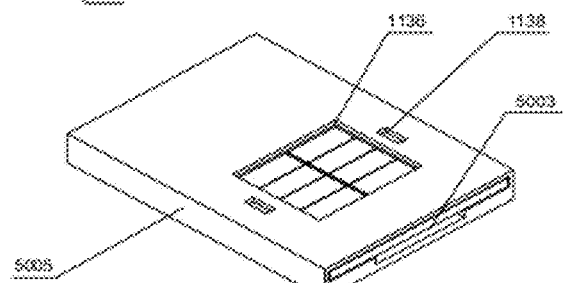
FIG. 6

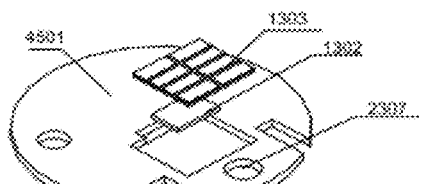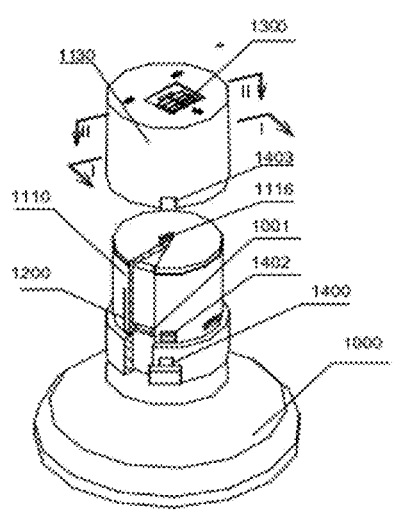

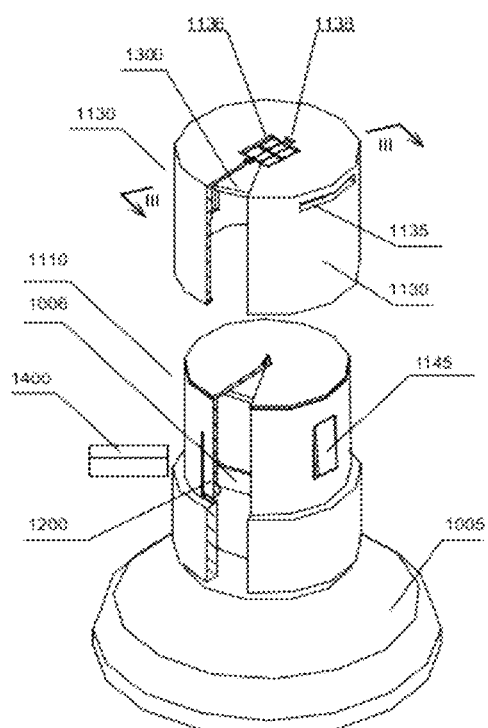
FIG. 26
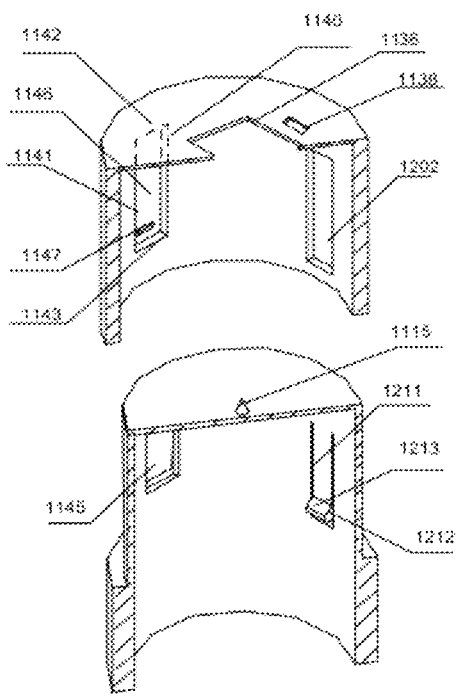
FIG. 27 (III-III)
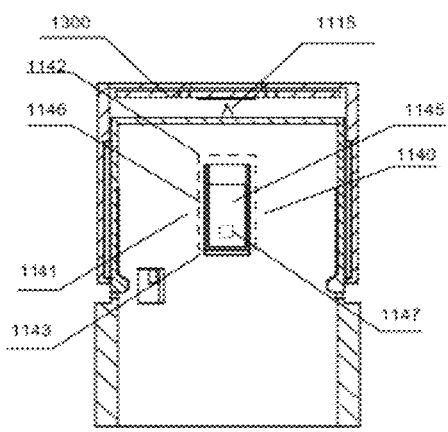
FIG. 28
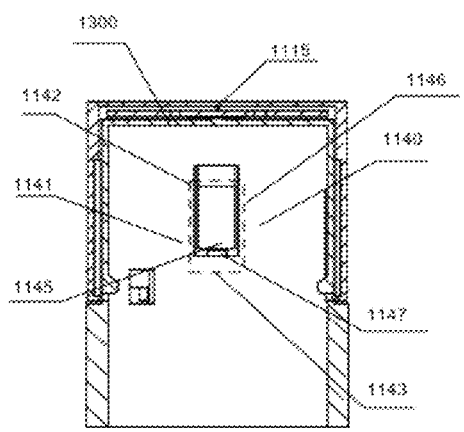
FIG. 29

SYSTEM FOR ELECTRONICALLY SEALING AN ITEM AND VERIFYING THE AUTHENTICITY OF THE ITEM SEALED

CROSS-REFERENCE TO RELATED PUBLICATIONS

This application claims the benefit of provisional patent application Ser. No. 61/374,643, filed 2010 Aug. 18 by the present inventor.

FIELD OF THE INVENTION

The invention relates generally to a system that includes an apparatus for electronically identifying an item with a contact smart card, and a device for verifying the information stored in the card. The system is suitable for anti counterfeit and Internet of Things.

BACKGROUND OF THE INVENTION

Valuable products are often produced and inserted into the supply chain surreptitiously by counterfeit producers. Most consumers do not have the expertise to distinguish such counterfeit products from legitimate products. Accordingly, there are needs for a suitable system to help consumers to examine the authenticity of a valuable product during purchase.

Over the last decade, several types of apparatus with inclusion of a RFID have been proposed or implemented to combat counterfeit. In such a way the ID information of a product is compiled and stored in an integrated circuit by the manufacture, and retrieved to examine the authenticity using an external reader and centralised systems when the product is being sold to a consumer.

In U.S. Pat. No. 6,226,619 B1, Halperin is observed as describing a tagging mechanism that includes an electronic tag and visible indicia that are attached to an item. Therefore, the authenticity of an item can be checked by the comparison of the number stored in the tag and displayed in the indicia. However this patent has not provided an efficient mechanism to disable the electronic tag so that it leaves chances to reuse the tag for counterfeit products.

In U.S. Pat. No. 7,061,382 B2, Claessens is observed as describing an apparatus with RFID tag embedded in a bottle cap and a ratchet mounted on the bottle cork. The authenticity information of the content in the bottle is stored in the RFID tag that would be destroyed upon removal of the cap. The success of the disabling the RFID tag depends on the degree of friction between the cork and bottle surface and the ability of the cork to resist the rotating torque when the cap is unscrewed from the bottle. Therefore, it is not a reliable means for disabling the RFID tag.

In U.S. patent application publication 2008/0069736 A1, Mingerink is observed as describing several types of containers on which a RFID tag is affixed. The tag includes an integrated circuit and an antenna. The information of the contents stored in the integrated circuit can be interrogated by a reader in order to identify the contents included in the container. The deactivation of the tag is generated by the disconnection of the integrated circuit and the antenna. The integrated circuit remains functioning. There are chances for a counterfeiter to recover the used container and reuse it for counterfeit products.

In China Patent application publication CN 1247147A, the inventor is observed as describing a bottle cap in which a RFID tag is embedded. The bottle cap includes an inner cap and an outer cap. The tag would be fractured when outer cap rotates with respect to inner cap. However the solution proposed is not viable due to the ways in which the inner cap engages the outer cap and the bottle.

In China Patent application publication CN 2397060Y, the inventor is observed as describing a bottle cap in which a RFID tag is embedded. The tag is disposed in between the outer cap and the inner cap of a child-proof cap for medicine. The cap is limited to plastic material and use with a bottle having screwing neck only.

Using RFID for anti-counterfeit has major drawbacks. Firstly there are as many as five different RFID standards existing simultaneously. This would lead to technical difficulties and would increase the expense of the examination system. Secondly, RFID technology has physical limitations such as the inability to read through liquids or metals. These limitations have reduced its efficacy and narrowed its application in combating counterfeit.

Although many inventors claim that an interrogating device is a part of their invention, all of them failed to provide a comprehensive design of such a device. In fact, existing tag readers are expensive and require a sophisticated network to exchange information with a remote database. As a result, there has been a persistent need for cost effective readers and a satisfactory data exchange network when applying an electronic tag to deter counterfeiting.

It is an objective of the present invention to provide an apparatus suitable for using various contact smart cards to store authentic information so as to extend the application of an electronic anti-counterfeit system to products that include metal or liquid.

It is further an objective of the present invention to provide an improved apparatus and method for protecting the authenticity of consumable products. In a locked status, the apparatus prevents the product to which it is attached from being used and provides the authenticity information of the product. The apparatus will disable the authenticity information when the product is released for consuming.

It is further an objective of the present invention to provide a cost effective apparatus and method for verifying the authenticity information stored in the contact smart card, by using public telecommunication networks and a remote centralised device.

SUMMARY OF THE INVENTION

According to this present invention, there is provided an anti counterfeit system that includes an apparatus for identifying an item with a contact smart card included to store the authenticity information of the item, and a card reader to allow examination of authenticity being conducted locally and/or remotely. The identifying apparatus has a housing embedded in or attached to the item, and a contact smart card. The housing is to provide coverage for the contact smart card and means for receiving the card reader. The identifying apparatus further has a locking means and a disabling means so as to form a tamper-evident electronic seal for consumable items. The locking means prevents the normal use of the item sealed, such as locking the container or blocking functionality. The disabling means will fracture the contact smart card in the operation of unlocking the apparatus. The identifying apparatus further has a releasing means for facilitating unlocking the apparatus, which engages both the locking means and the disabling means. The integrated circuit of the contact smart card will be permanently and physically disabled by the disabling means when the lock means is released. The card reader includes a central operating unit, an interface to the contact smart card, an interface to a portable electronic device and an interface to users. The central operating unit is to provide power, clock and controls for operating the contact smart card. The central operating unit further converts the communication protocol defined by the contact smart card into the communication protocol accepted by the portable electronic device. The interface to the contact smart card includes an adaptor of contact smart card and a fastening means to engage the identifying apparatus. The card reader further includes a power switch interlocking with the fastening means so that the power of the card reader is automatically turned on when the card reader is in engagement with the apparatus and turned off when the card reader is disengaged from the apparatus.

BRIEF DESCRIPTION OF THE DRAWINGS

The purposes, aspects and advantages of the present invention will be better understood by reference to the following drawings of preferred embodiments, wherein:

FIG. 2 illustrates a perspective exploded view of an electronic tag for identifying durable products in accordance with one embodiment.

FIG. 3 illustrates a perspective view of the housing of the electronic tag.

FIG. 4 illustrates a perspective exploded view of the contact smart card included in the electronic tag.

FIG. 5 illustrates a perspective exploded view of a modified electronic tag for identifying durable products in accordance with another embodiment.

FIG. 6 illustrates a perspective view of the housing of the modified electronic tag.

FIG. 21 illustrates a partial cut-away perspective exploded view of an electronic tamper-evident cap for identifying a bottle with annular recess in its neck in accordance with another embodiment.

FIG. 22 illustrates a perspective exploded view of the contact smart card included in an electronic tamper-evident cap.

FIG. 23 illustrates a sectional view of the electronic tamper-evident cap taken along line I-I.

FIG. 24 illustrates a sectional view of the electronic tamper-evident cap in a locked position taken along line II-II.

FIG. 25 illustrates a sectional view of the electronic tamper-evident cap in an unlocked position taken along line II-II.

FIG. 26 illustrates a partial cut-away perspective exploded view of the electronic tamper-evident cap modified for identifying a bottle with annular protrusion in its neck in accordance with another embodiment.

FIG. 27 illustrates a sectional view of the modified electronic tamper-evident cap taken along line III-III.

FIG. 28 illustrates a sectional view of the modified electronic tamper-evident cap in a locked position.

FIG. 29 illustrates a sectional view of the modified electronic tamper-evident cap in an unlocked position.

DETAILED DESCRIPTION OF PREFERRED EMBODIMENTS

This present invention relates to a system that electronically seals and verifies the authenticity of the item being sealed. The system comprises an apparatus with a contact smart card for identifying the item, and a card reader for verifying the authenticity of the item. The identifying apparatus may have an appearance of a button, a box lock, a belt fastener, a clamp or a bottle cap. The card reader is for connecting the contact smart card included in the apparatus with a portable electronic device like cellular phone or a cordless phone.

Referring now to FIG. 1-4, there is illustrated an electronic tag 5000 constructed in accordance with the principles of the present invention for identifying the item in which it is embedded. According to this presently preferred embodiment of the invention, the electronic tag 5000 has a contact smart card 5100 and a housing constructed with a cavity 5002 extends from a side surface thereof and a faceplate 5001. The faceplate 5001 has a rectangular opening 1136 for receiving a SIM card adaptor and a plurality of elongated apertures 1137 for engaging the fastening means of the card reader, as will be further explained in an embodiment of card reader. The contact smart card 5100 is mounted in the cavity 5002. The housing may be embedded in the product by means of sewing, welding or riveting.

The contact smart card 5100 comprises an insulator plate 1301, an integrated circuit 1302, and a reader interface constructed with a plurality of electrical contacts 1303. The integrated circuit 1302 and the electrical contacts 1303 are mounted on the same side of the insulator plate 1302 to form a thin flat card. The integrated circuit 1302 stores the information from the manufacturer that can be verified afterwards. The electrical contacts 1303 provide the connection to a reader for exchanging data and receiving power, clock and control. The electrical contacts 1303 is in alignment with the opening 1136 of the faceplate 5001 to facilitate connecting a card reader. The round apertures of the plate are disposed to provide rooms for the fastening means of the card reader. Those skilled in the art will recognise that the reader interface can also be constructed with an antenna to form a contactless card for use in an application without appearance of significant metal parts.

Figure 1:
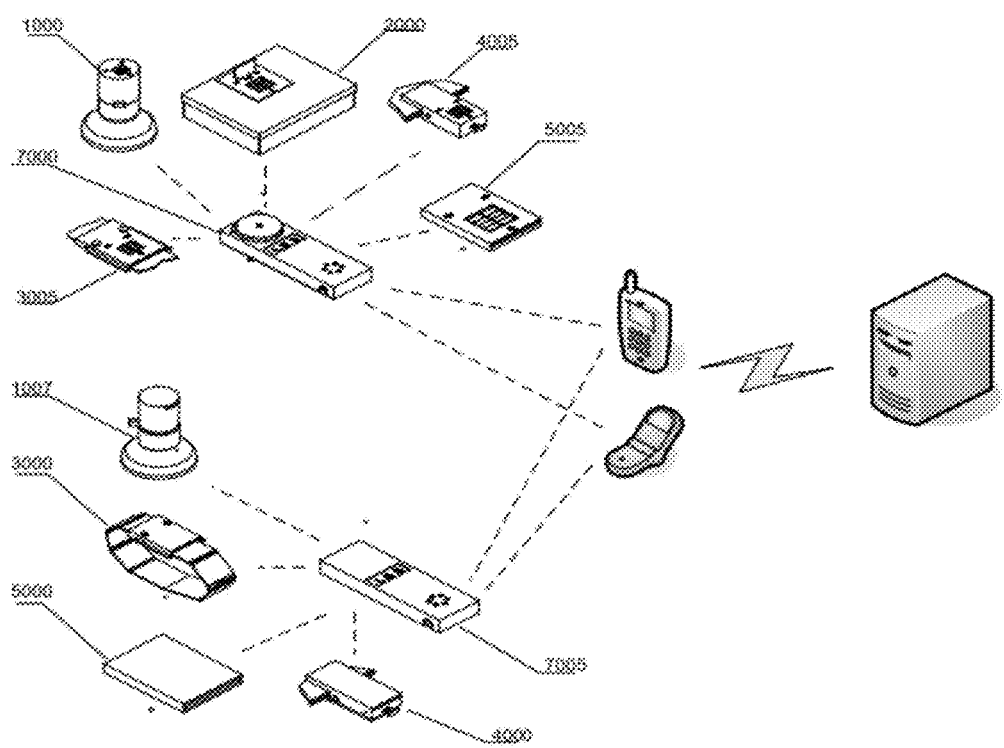
FIG. 1 illustrates an exemplary block diagram of a system including an identifying apparatus and a card reader to be used with a portable electronic device.
Figure 7:
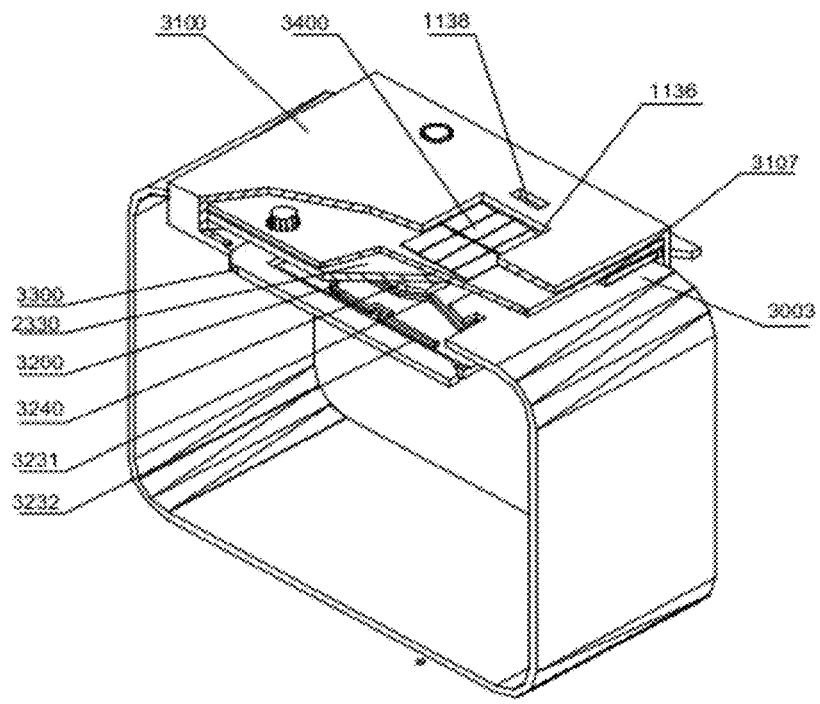
FIG. 7 illustrates a partial cut-away perspective view of an electronic tamper-evident fastener mounted on a belt in accordance with another embodiment.
Figure 8:
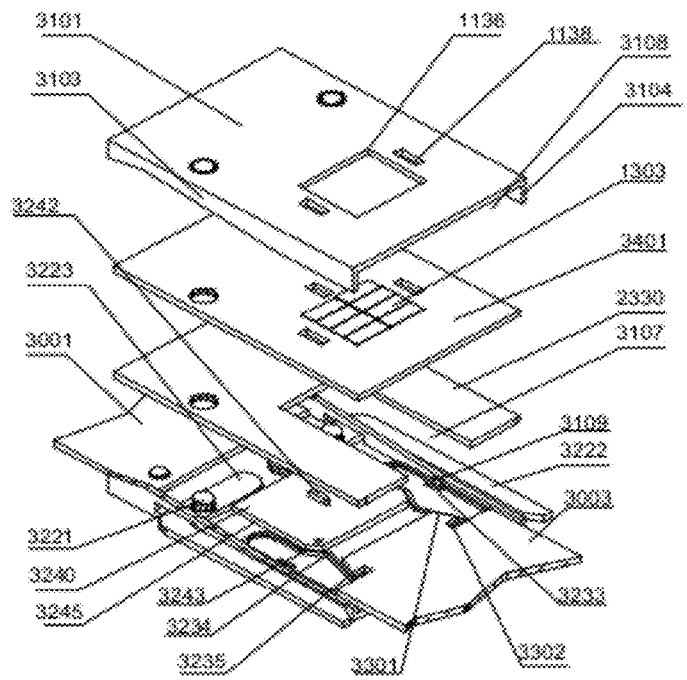
FIG. 8 illustrates a cut-away perspective view of the electronic tamper-evident fastener in a locked position.
Figure 9:
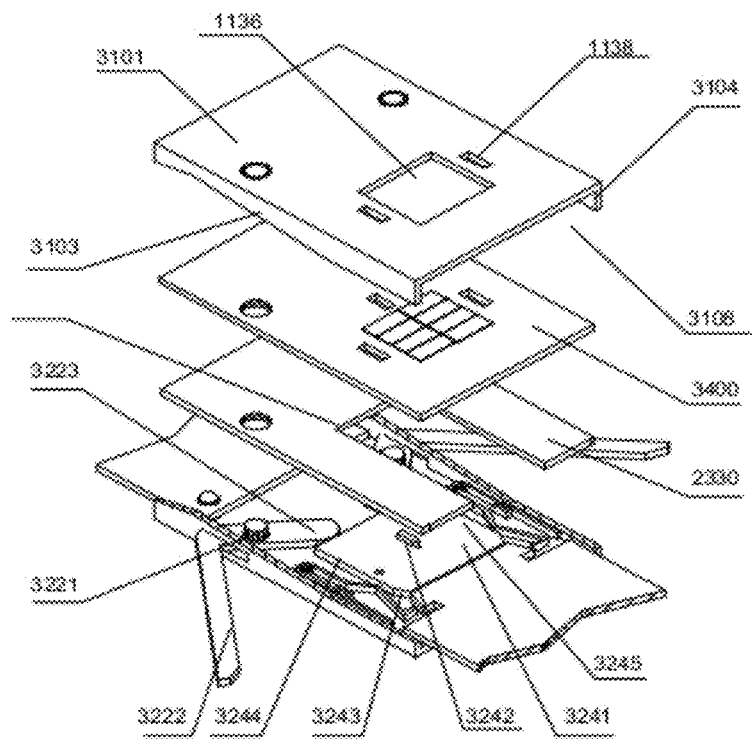
FIG. 9 illustrates a cut-away perspective view of the electronic tamper-evident fastener in an unlocked position.
Figure 10:
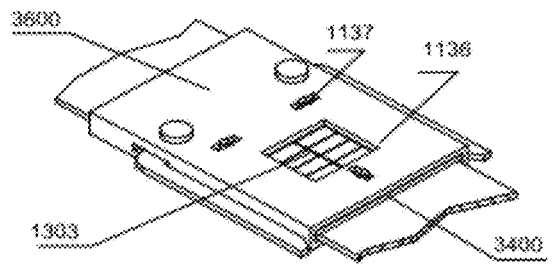
FIG. 10 illustrates a perspective view of a modified electronic tamper-evident fastener mounted on a belt in accordance with another embodiment.
Figure 11:
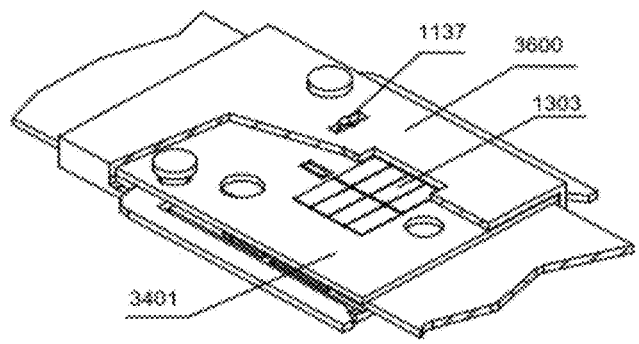
FIG. 11 illustrates a partial cut-away perspective view of a modified electronic tamper-evident fastener mounted on a belt in accordance with another embodiment.
Figure 12:
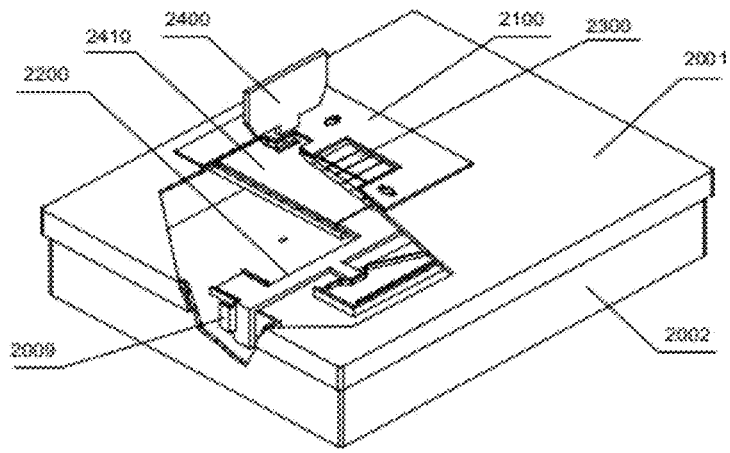
FIG. 12 illustrates a partial cut-away perspective view of the electronic tamper-evident lock for identifying a box with a removable lid in accordance with another embodiment.
Figure 13:
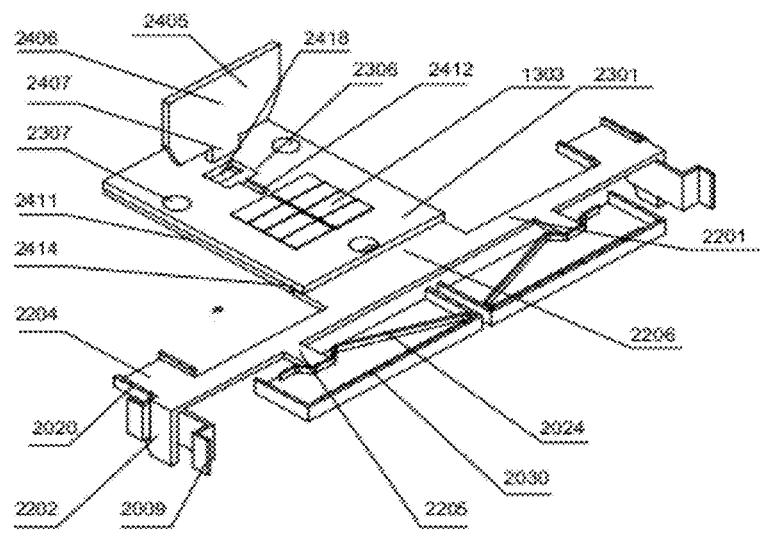
FIG. 13 illustrates a cut-away perspective view of the electronic tamper-evident lock in a locked position.
Figure 14:
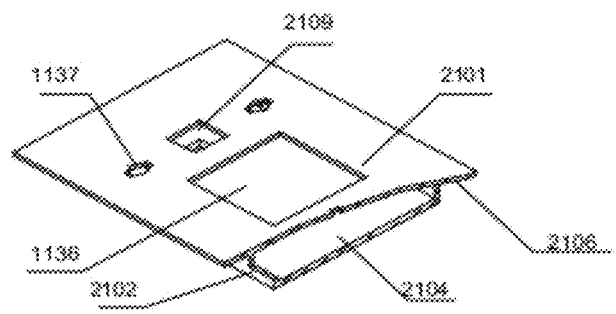
FIG. 14 illustrates a cut-away perspective view of the electronic tamper-evident lock in an unlocked position.
Figure 15:
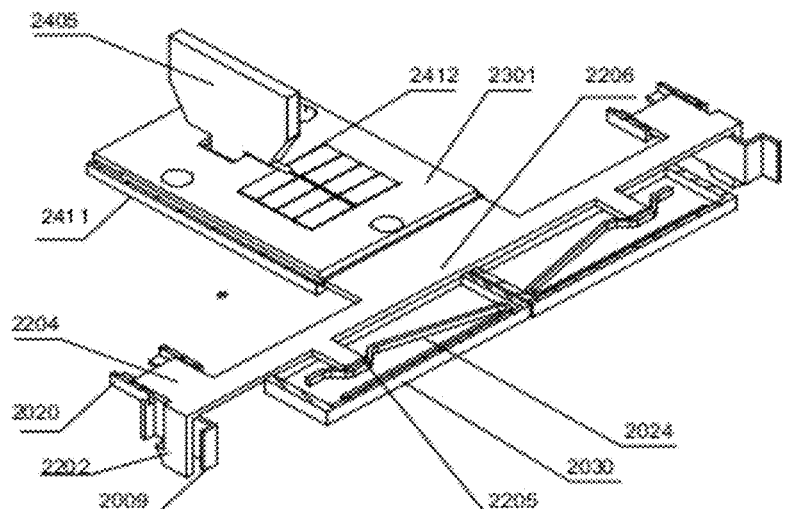
FIG. 15 illustrates a partial cut-away perspective view of the housing of the electronic tamper-evident lock.
Figure 16:
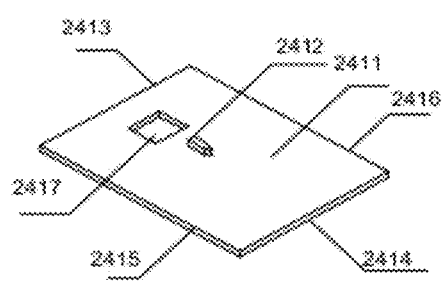
FIG. 16 illustrates a perspective view of the disabling means of the releasing means of the electronic tamper-evident lock.
Figure 17:
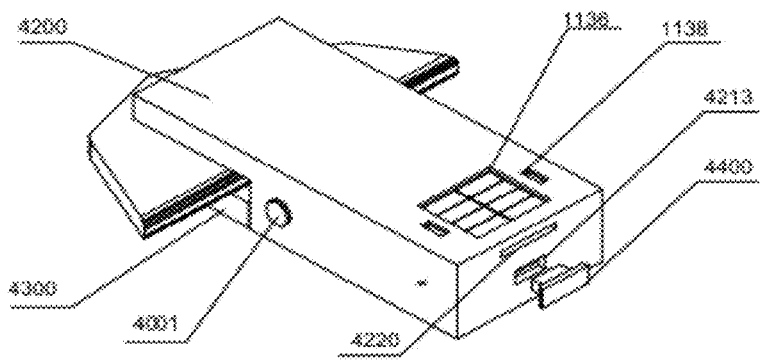
FIG. 17 illustrates a perspective view of an electronic tamper-evident clamp attached on an object in accordance with another embodiment.

Referring now to FIG. 1, FIG. 5 and FIG. 6, there is illustrated a modified electronic tag 5005. Alternatively, the housing of electronic tag 5005 has elongated apertures 1138 and a slot 5003 extends from a side surface to engage the fastening means of a card reader, as will be further explained in an embodiment of card reader.

Referring now to FIG. 1, FIG. 7-9 there is illustrated an electronic tamper-evident belt fastener 3000 constructed in accordance with the principles of the present invention for identifying the original content wrapped with the belt until it is released for the first time. According to this presently preferred embodiment of the invention, the fastener 3000 is constructed with a housing 3100, a lock means 3200, a contact smart card 3400, a disabling means 3240 and a releasing means 3300. The fastener 3000 is mounted on one end of the belt and a catch 3003 is disposed at another end of the belt. The fastener 3000 engages the catch 3003 with the locking means 3200. Releasing the catch 3003 from the fastener 3000 will cause fracture the contact smart card 3400.

The housing 3100 of the fastener 3000 is constructed with a faceplate 3101 and a cavity 3108 which receives the contact smart card 3400 and the catch 3003. The cavity 3108 has a pair of opposed side walls 3103, 3104. Each of the opposed side walls has a slot 3106 to receive the releasing means 3300. Each of the opposed side walls further has a tab 3109 on the inner surface to engage the locking means 3200. The faceplate 3101 has a square opening 1136 for receiving a SIM card adaptor of a card reader. The housing 3100 further has elongated apertures 1138 on faceplate 3101 to engage the fastening means of a reader.

The locking means 3200 includes a latch 3230 that is constructed with a U-shaped spring. The U-shaped spring has an arm 3231 and an arm 3232. The arm 3231 has a bend 3233 for engaging the tab 3109 so as to retard the longitudinal movement with respect to the housing 3100. There is a V-shaped elbow 3234 on the arm 3232 that extends outwardly for receiving the force from disabling means 3340. There is further a hook 3235 disposed at the end of the arm 3232 and it is biased by the spring for engaging with the catch 3003 so as to fasten the belt on the item. The catch 3003 is constructed with a plate having a pair of sloping surfaces 3301 and a pair of recesses 3302 to engage with the hook 3235 of latch 3230.

The locking means 3200 further has a spacer plate 2330 to restrain the movement of catch 3003 towards faceplate 3101 of housing 3100. The spacer plate 2330 has an opening 3107 to engage the fastening means of a reader.

The releasing means 3300 comprises a pair of levers for user to operate. Each of the levers is L-shaped and constructed with a cam 3222 and a handle 3223. The handle 3223 has a bevelled corner 3224 at the end thereof to facilitate the lifting operation. The cam 3222 is mounted on and pivots about a fulcrum 3221 between a locked position and an unlocked position. The disabling means 3240 comprises a base plate 3241 and a blade 3242. The base plate 3241 has opposed sides 3244, 3245 and a pair of bevelled corners 3243. The blade 3242 protrudes from the top surface of the base plate 3241 with the cutting edge toward the contact smart card 3400. In the locked position, the opposed sides 3244, 3245 of the base plate 3241 are in alignment with the straight portion of the arm 3232 of the latch 3230 so that the hook 3235 is biased by the spring and engages the catch 3003. To release the lock means, one needs to lift the handles 3223 of the levers to the unlocked position so that the cam 3222 urges the disabling means 3240 to slide toward the V-shaped elbows 3234 of the latch 3230. When the opposed sides 3244, 3245 of the base plate 3241 contact the V-shaped elbows of the latch 3230, the hooks 3235 will be urged apart from each other so as to release the catch 3003.

The contact smart card 3400 has a base plate 3401, an integrated circuit 1302, and a reader interface constructed with a plurality of electrical contacts 1303. Contact smart card 3400 may be fixed to the inner surface of the housing 3100 by means of gluing, screwing or riveting.

Referring now to FIG. 1, FIGS. 10-11 and FIG. 31 there is illustrated a modified electronic tamper-evident belt fastener 3005 constructed in accordance with the principles of the present invention for identifying the original content wrapped with a belt until being released for the first time. The fastener 3005 is constructed with a housing 3600, a lock means 3200, a releasing means 3300 and a contact smart card 3400. The fastener 3005 is mounted on one end of the belt and a catch 3003 is disposed at another end of the belt. The fastener 3005 engages catch 3003 with the locking means 3200. Releasing the fastener 3005 will cause fractures to contact smart card 3400.

In modification, the elongated apertures 1138 are replaced by apertures 1137 for engaging the fastening means of a card reader. The contact smart card 3400 has a base plate 3401, an integrated circuit 1302, and a reader interface constructed with a plurality of electrical contacts 1303. Contact smart card 3400 is mounted on the inner surface of housing 3600 with electrical contacts 1303 is in alignment with a square opening 1136.

Referring now to FIG. 1 and FIG. 12-16, there is illustrated an electronic tamper evident lock 2000 constructed in accordance with the principles of the present invention for s identifying the original content in a box until being opened for the first time. The box includes a lid shell 2001 and base shell. 2002. According to this presently preferred embodiment of the invention, the lock 2000 is mounted on the lid shell 2001 and constructed with a housing 2100, a locking means 2200, a contact smart card 2300, a disabling means 2410 and a releasing means 2400. The lock 2000 locks the box by engaging the locking means 2200 with the catch 2009. Disengaging the catch 2009 from the locking means 2200 will cause fractures to the contact smart card 2300.

The housing 2100 is constructed with a faceplate 2101 and a cavity 2104. The faceplate 2101 of the housing 2100 has a rectangular opening 1136 for receiving the SIM card adaptor of a card reader and a plurality of apertures 1137 for engaging with the fastening means of a card reader. The faceplate 2101 further has a rectangular aperture 2109 for receiving the releasing means 2400. The housing 2100 is fitted in an opening disposed on the lid shell 2001. A flange 2106 of the housing 2100 facilitates the engagement between the housing 2100 and the lid shell 2001. The cavity 2104 is for receiving the locking means 2200 and contact smart card 2300. The cavity 2104 includes a pair of side walls 2102.

The contact smart card 2300 has a base plate 2301, an integrated circuit 1302, and a reader interface that is constructed with a plurality of electrical contacts 1303. The contact smart card 2300 is mounted on the inner surface of the housing 2100 with the electrical contacts 1303 in alignment with the square opening 1136. The base plate 2301 has a rectangular aperture 2306 dimensioned similar to and disposed in alignment with the aperture 2109 of the housing 2100 for receiving the releasing means 2400. The base plate 2301 further has a plurality of round apertures 2307 to provide space for the hooks of reader to rotate. The contact smart card 2300 may be fixed onto the inner surface of the housing 2100 by means of gluing, screwing or riveting.

The locking means 2200 comprises a spring 2024 and a latch 2201. Spring 2024 is U-shaped and disposed to bias latch 2201 for locking the box. The latch 2201 comprises a flat rod and a hook 2202 disposed at each end. The flat rod has a first pair of tabs 2204 on one side thereof and a second pair of tabs 2205 on another side thereof. The locking means 2200 further includes a first pair of lugs 2020 and a second pair of lugs 2030 disposed on the inner surface of the lid shell 2001. The lugs 2020 are to receive tabs 2204 and the lugs 2030 are to receive the tabs 2205. Thus the latch 2201 is retained by the lugs 2020 and the lugs 2030, and transversely moveable with respect to the lid shell 2001. The locking means 2200 further includes a catch 2009 disposed on the inner surface of the base shell 2002, which is to be engaged with the hook 2202 of the latch 2201. The flat rod of the latch 2201 further includes a tab 2206 in the middle to engage the releasing means 2400 so as to be urged to disengage the hook 2006 from the catch 2009.

The disabling means 2410 is constructed with a base plate 2411 and a blade 2412. The blade 2412 is protruding from the top surface of the base plate 2411 with the cutting edge toward the integrated circuit 1302 of the contact smart card 2300. The base plate 2411 is rectangular-shaped and has a first pair of opposed sides 2413, 2414 and a second pair of opposed sides 2415, 2416. The opposed sides 2415, 2416 are spaced apart slightly less than the distance between the opposed side walls 2102 of cavity 2104 of housing 2100 so that base plate 2411 is able to slide along the side walls 2102. The base plate 2411 further has a rectangular aperture 2417 which is preferably dimensioned similar to and positioned to partially intersect the aperture 2109 of the housing 2100 and the aperture 2306 of the contact smart card 2300 so as to form an elongated keyway 2418. The releasing means 2400 comprises a key 2405 for user to operate. The key 2405 has a shaft 2406 and a holding head 2407. The shaft 2406 is constructed with a tab having an elongated section that extends from the holding head 2407. The shaft 2406 of the key 2405 is fitted into the keyway 2418 and rotatable with respect to the housing 2100 between a locked position and an unlocked position. As a consequence, the shaft 2406 drives the disabling means 2410 to move transversely from a first position to a second position. In the second position, the integrated circuit 1302 of the contact smart card 2300 is fractured by the blade 2412 of the disabling means 2410 so that the information stored in the contact smart card 2300 is physically destroyed. In the mean-time, the latch 2201 of the locking means 2200 is urged by the disabling means 2410 to disengage from the catch 2009. Thus the lid shell 2001 is ready to be removed from the base shell 2002.

Referring now to FIG. 1, FIGS. 17-19 and FIG. 35 there is illustrated an electronic tamper-evident clamp 4000 constructed in accordance with the principles of the present invention for identifying an item to which it is attached until being removed for the first time. According to this presently preferred embodiment of the invention, the clamp 4000 comprises a fulcrum 4001 and a pair of arms 4200, 4300 that pivot about the fulcrum 4001 between a locked position and an unlocked position. There is an opening 4700 defined by the jaw portions of opposed arms, which is to receive the item to be sealed. The clamp 4000 further comprises a latch bolt 4100, a safety plug 4400 and a contact smart card 4500. The clamp 4000 is locked onto the item through the latch bolt 4100. Releasing the clamp 4000 will cause fractures to the contact smart card 4500.

The arm 4200 comprises a handle portion 4215 and a jaw portion 4216. The handle portion 4215 has a faceplate 4210 and a skirt 4211 so that a cavity 4214 is defined. The faceplate 4210 has a square opening 1136 for receiving a SIM card adaptor and a plurality of apertures 1138 for engaging fastening means of a card reader. The skirt 4211 has an aperture 4213 at the lower rim for engaging the safety plug 4400 and a slot 4220 to receive the inserted locking means of a reader. The skirt 4211 further has a pair of opposed apertures to receive the fulcrum 4001. The jaw portion 4216 of arm 4200 has a recess 4212 on the surface facing toward the arm 4300.

The contact smart card 4500 has a base plate 4501, an integrated circuit 1302, and a plurality of electrical contacts 1303. The contact smart card 4500 is fixed into the cavity 4214 of the arm 4200 by means of gluing, screwing or riveting. The electrical contacts 1303 are accessible through the slot 4220 of the arm 4200.

The arm 4300 comprises a handle portion 4310, a jaw portion 4320 and a pair of opposed lugs 4313 to receive the fulcrum 4001. The handle portion 4310 has a prong 4312 that extends towards the integrated circuit 1302 of the contact smart card 4230. The jaw portion 4320 has a through-hole 4322 disposed in alignment with the aperture 4212 on the opposed arm 4300. The latch bolt 4100 is fitted in the through-hole 4332 and engaged with the aperture 4212. The latch bolt 4100 is substantially dimensioned so as to be retained by the through-hole 4332. As such, a dead loop is formed between the latch bolt 4100, the jaw portions 4320 and the jaw portion 4216 of the opposed arm 4200. The handle portion 4310 further has a groove 4311 and the jaw portion 4320 further has an arm 4321 that extrudes outwardly from the side faces to the handle portion 4310. The arm 4321 is received by the groove 4311 so as to form an extendable mechanism. The arm 4321 has a boss 4326 raised at the end thereof to prevent the complete separation between the jaw portion 4320 and the handle portion 4311.

To remove the clamp from the object attached, it needs to apply force onto the handle portions so as to widen the gap between the jaw portions of the arms. As a consequence, the end of the latch 4100 is removed from the aperture 4212 and the loop previously closed by the latch 4100 is now opened. The jaw 4320 is freed to slide outwardly and this will further facilitate the clamp to separate from the item being attached. The same operation will also cause the prong 4312 to thrust into the integrated circuit 1302 of the contact smart card 4500.

The safety plug 4400 comprises a rod 4401 with a flanged end 4402. In assembly, the rod 4402 is inserted into the aperture 4213 of the arm 4200 and engaged with the arm 4300 so that the inadvertent relative movement between the arm 4200 and the arm 4300 is therefore prevented. The flanged end 4402 is to facilitate the operation of safety plug 4400.

Figure 20:
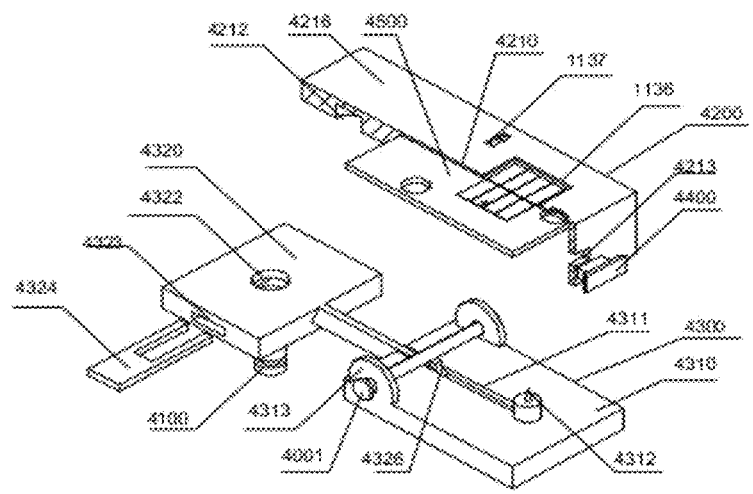
FIG. 20 illustrates a cut-away perspective exploded view of a modified electronic tamper-evident clamp.
Figure 30:
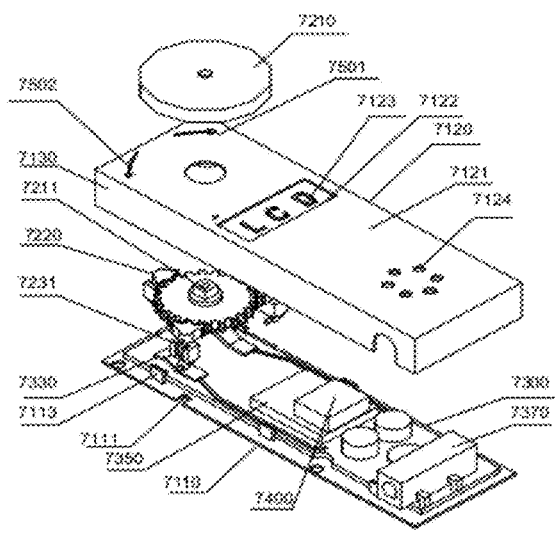
FIG. 30 illustrates a perspective exploded view of a reader for verifying an electronic identifying apparatus in accordance with one embodiment, the reader having a turning fastening means.
Figure 31:
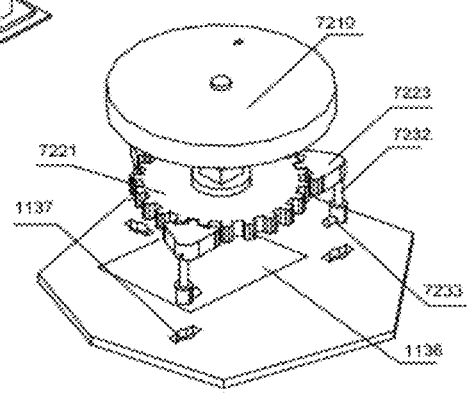
FIG. 31 illustrates a perspective view of the turning fastening means of the reader.
Figure 32:
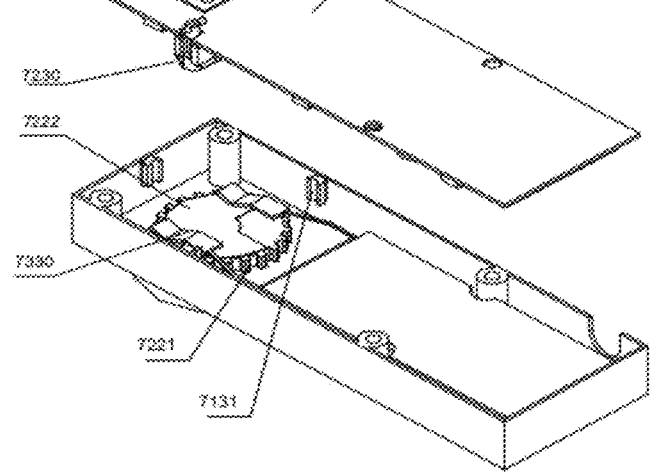
FIG. 32 illustrates an underside perspective exploded view of the reader having a turning fastening means.
Figure 33:
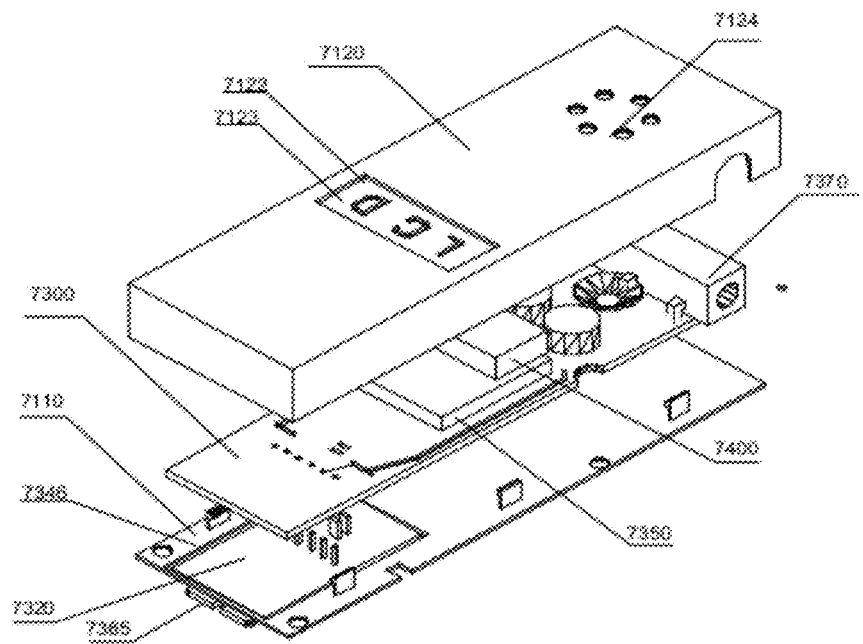
FIG. 33 illustrates a perspective exploded view of a modified reader for verifying an electronic identifying apparatus in accordance with another embodiment, the reader having an inserted fastening means.
Figure 34:
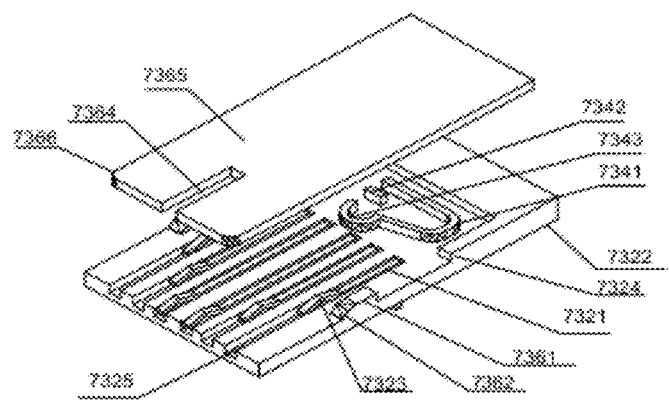
FIG. 34 illustrates an underside perspective view of the inserted fastening means of the modified reader for an electronic identifying apparatus.
Figure 35:
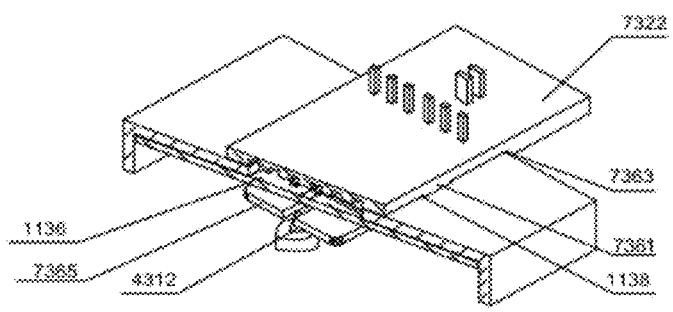
FIG. 35 illustrates an underside perspective view of the inserted fastening means engaged with an electronic tamper-evident clamp.
Figure 36:
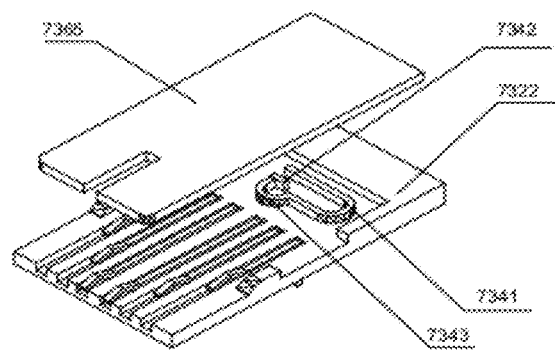
FIG. 36 illustrates an underside perspective view of the switch position of inserted fastening means in engaged position.

Referring now to FIG. 1 and FIG. 20 there is illustrated a modified electronic tamper-evident clamp 4005. The clamp 4005 comprises a pair of arms 4200, 4300 which pivot about a fulcrum 4001 between a locked position and an unlocked position. The clamp 4005 further comprises a latch bolt 4100, a safety plug 4400 and a contact smart card 4500. The clamp 4005 is locked onto the item through the latch bolt 4100. Releasing the clamp 4000 will cause fractures to the contact smart card 4500.

In modification, the slot 4220 and apertures 1137 are replaced by a plurality of apertures 1137 for engaging the fastening means of a card reader. Contact smart card 4500 is mounted on the inner surface of arms 4200 with electrical contacts 1303 is in alignment with a square opening 1136. The jaw portion 4320 of the arm 4300 further has a slot 4323 on side surface thereof and a cotter 4324. The slot 4323 intersects the through-hole 4322. The cotter 4324 is substantially fitted into the slot 4323 and engages the latch 4100 so as to retard axial movement of the latch 4100.

Referring now to FIG. 1, FIG. 21-25 there is illustrated an electronic tamper-evident cap 1000 constructed in accordance with the principles of the present invention for identifying the original content in a bottle until being opened for the first time. The electronic tamper-evident cap 1000 may be used with a bottle having an annular recess or an annular. Following description is based on a bottle with an annular recess 1001. According to this presently preferred embodiment of the invention, the tamper-evident cap 1000 includes a housing, a locking means 1200, a contact smart card 1300 and a safety mechanism 1400. The tamper-evident cap 1000 is locked on the bottle by engaging the locking means 1200 with the recess 1001. Unlocking the cap 1000 will cause fractures to the contact smart card 1300.

The housing of cap 1000 comprises an inner portion 1110 and an outer portion 1130. The inner portion 1110 has a faceplate 1111, a skirt 1112 and a cavity 1113. The cavity 1113 is constructed to protect the open end of the bottle. The skirt 1112 has a plurality of openings 1201 to provide a passage for the locking means 1200. The skirt 1112 further has a plurality of circumferential notch 1117 disposed circumferentially to engage with the outer portion 1130 of the housing. Each of the circumferential notches 1117 is constructed with a first pair of opposed sides 1118 and 1119, and a second pair of opposed sides 1120 and 1121. The skirt 1112 further has a raised lower portion 1114 which defines a shoulder 1122 at the outer surface thereof to facilitate release of the cap. The faceplate 1111 has an elongated tab 1116 protruding upwardly to form a disabling means. The longer side of tab 1116 is positioned to abut the integrated circuit of the contact smart card 1300. The outer portion 1130 of the housing has a faceplate 1131, a skirt 1132, and a cavity 1133. The cavity 1333 is contoured to receive the inner portion 1310 and retain the contact smart card 1300 and the locking means 1200. The skirt 1132 has a plurality of tabs 1134 disposed on the inner surface thereof to engage with the circumferential notch 1117 of the inner portion 1110 so that the outer portion 1130 is rotatable with respect to the inner portion 1110. In releasing the cap, the tab 1134 travels along the sides 1120, 1121 of the circumferential notch 1117 from the side 1118 to the side 1119 between a locked position and an unlocked position respectively. The skirt 1132 further has a plurality of elongated recesses 1202 disposed longitudinally on the inner surface thereof to provide clearance for outward movement of the locking means 1200 as will be explained below. The faceplate 1131 has a square opening 1136 and a plurality of apertures 1137. The square opening 1136 is disposed to receive the SIM card adaptor of a card reader. The apertures 1137 are to engage the fastening means of a card reader.

The contact smart card 1300 comprises an insulator plate 1301, an integrated circuit 1302, and a reader interface constructed with a plurality of electrical contacts 1303. The contact smart card 1300 is mounted on the inner surface of the outer portion 1130 with the electrical contacts 1303 in alignment with the square opening 1136. The contact smart card 1300 may be mounted on the inner surface of the outer portion 1130 by means of gluing, screwing or riveting.

The locking means 1200 comprises a latch bolt constructed with a resilient arm 1211 and a tab 1212 protruding laterally at one end of the resilient arm 1211. The resilient arm 1211 engages the inner portion 1110 of the housing with another end thereof so that the tab 1212 is moveable in radial direction with respect to the housing. The tab 1212 is received by openings 1201 and biased by the resilient arm 1211 to engage the recess 1001 of the bottle. The tab 1212 has a ramp surface 1213 facing the recess 1001 to facilitate disengaging from the bottle in the unlocked position. However, the engagement between the tab 1212 and the recess 1001 is retained by the inner surface of the outer portion 1130 of the housing in the locked position. To release the locking means 1200 one may hold the lower area 1114 of the inner portion 1110 and twist the outer portion 1130 of the housing in the direction of the unlocked position where the resilient arm 1211 is in alignment with the opening 1202 of the outer portion 1130 of the housing. In the unlocked position, lifting the cap 1000 from the bottle will cause the rim of the recess 1001 to urge the ramp surface 1213 of the tab 1212 so that the resilient arm 1211 is bent outwardly to disengage the tab 1212 from the recess 1001 of the bottle. The rotation of the outer portion 1130 about the inner portion 1110 further moves the elongated tab 1116 of the disabling means to crush the integrated circuit 1302 of the contact smart card 1200 so that the information stored is permanently physically destroyed.

The safety mechanism 1400 has a pin 1401 and an enlarged head at one end thereof. There is an aperture 1402 disposed on the inner portion 1120 around the shoulder 1122 and a recess 1403 disposed on the rim of the skirt 1132 of the outer portion 1130. The pin 1401 of the safety mechanism 1400 is retained by and removable from the aperture 1402. The outer portion 1130 of the housing engages the safety mechanism 1400 with the recess 1403 thereof. Therefore, the inadvertent rotating movement of the outer portion 1130 against the inner portion 1120 is therefore retarded by the pin 1401.

Referring now to FIG. 1, FIG. 26-29 there is illustrated a modified electronic tamper-evident cap 1007. The electronic tamper-evident cap 1007 may be used with a bottle having an annular recess or an annular. Following description is based on a bottle with an annular protrusion 1006. According to this presently preferred embodiment of the invention, the tamper-evident cap 1007 includes a housing, a locking means 1200, a contact smart card 1300 and a safety mechanism 1400. The tamper-evident cap 1007 is locked on the bottle by engaging the locking means 1200 with the protrusion 1002. Unlocking the cap 1007 will cause fractures to the contact smart card 1300.

The skirt 1112 of the inner portion 1110 has a resilient arm 1145 which extending downwardly outwardly on the outer surface thereof. The skirt 1132 of the outer portion 1130 has an elongated recess 1146 longitudinally disposed on the inner surface thereof to engage with the resilient arm 1145 of the inner portion 1110 so that the outer portion 1130 is axially moveable with respect to the inner portion 1110. The elongated recess 1146 is constructed with a first pair of opposed sides 1140, 1141 and a second pair of opposed sides 1142, 1143. In releasing the cap, the moveable end of resilient arm 1145 travels along the sides 1140, 1141 of the recess 1146 between a locked position and an unlocked position respectively. There is a rib 1147 disposed in the middle of the recess 1146 to engage with the moveable end of resilient arm 1145 and retain the locking means 1200 in an unlocked position. To release the locking means 1200 one may press the outer portion 1130 of housing down to the unlocked position where the latch 1210 is in alignment with the opening 1202 of the outer portion 1130 of the housing. In the unlocked position, lifting the cap 1007 from the bottle will cause the protrusion 1006 to urge the ramp surface 1213 of the tab 1212 so that the resilient arm 1211 is bent outwardly to disengage the tab 1212 from the protrusion 1006 of the bottle.

In the modification, the faceplate 1111 of the inner portion 1110 of the housing has a cone-shaped prong 1115 protruding upwardly to replace the elongated protrusion as a disabling means. In releasing operation, the downward movement of the outer portion 1130 will cause the cone-shaped prong 1115 to intersect with the integrated circuit 1302 of the contact smart card 1200 so that the information stored is physically destroyed.

In the modification, the outer portion 1130 of the housing has a slot 1135 disposed on the skirt 1132 and a plurality of apertures 1138 for securing fastening means of a card reader.

In the modification, the inadvertent axial movement of the outer portion 1130 with respect to the inner portion 1120 is retarded by the pin 1401.

Referring now to FIG. 1, FIGS. 30-32 and FIG. 37, there is illustrated a contact smart card reader 7000 constructed in accordance with the principles of the present invention for operating the contact smart card included in the electronic identifying apparatus as explained in the foregoing description. The card reader comprises a housing, a mother board, an interface to the contact smart card, an interface to users and an interface to a portable electronic device.

The housing has a base plate 7110 and a cover 7120. The base plate 7110 has a plurality of openings 7111 at the rim thereof and a rectangular opening 7112 disposed in the longitudinal axis thereof to provide the channel the contact smart card interface. The base plate 7110 further has a plurality of tabs 7113 for mounting the mother board. The cover 7120 comprises a faceplate 7121 and a skirt 7130. The faceplate 7121 has a rectangular opening 7122 and a plurality of apertures 7124 to facilitate mounting the interface to users. The skirt 7130 has a plurality of ridges 7131 which extend longitudinally and protrude from the inner surface thereof. Each of the ridges 7131 has a T-shaped section for mounting the fastening means of the interface to contact smart card.

Figure 37:
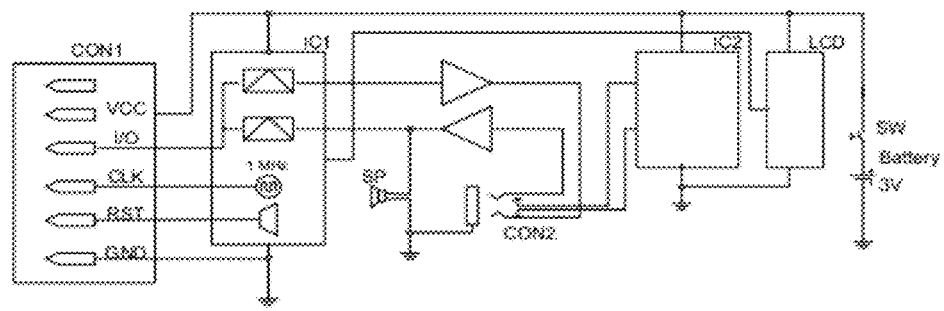
FIG. 37 illustrates a schematic diagram of the reader.

The interface to contact smart card includes a SIM card adaptor 7310, shown as CON1 in FIG. 37. The adaptor 7310 is mounted on the bottom surface of the mother board and received by the opening 7112 of the base plate 7110. The contacts of the SIM card adaptor extend beyond the outer surface of the base plate 7110 so as to facilitate the engagement with the corresponding contacts on the contact smart card. The interface to contact smart card is to provide an electromagnetic channel between the contact smart card and the card reader. Those skilled in the art will recognise that the interface to contact smart card can also include a RF transceiver for operating a RFID.

The interface to contact smart card further includes a fastening means comprising a knob 7210, a transmissions 7220 and a plurality of bolts 7230. The knob 7210 is mounted on a shaft 7211 and extending from the outer surface of the housing to facilitate the operation thereof. The knob 7210 is to be turned from a locked position and an unlocked position. Each of the bolts 7230 has a bearing 7231 and a shaft rod 7232 with a hook 7233 at one end thereof. The bearing 7231 has a T-shaped groove to engage the housing with the ridge 7131 in order to retain the shaft rod 7232. The hook 7233 is for engaging the housing of the electronically identifying apparatus. The transmissions 7220 are to couple the rotation of the knob 7210 onto the bolts 7230. The transmission 7220 has a master gear 7221 and a plurality of slave gears 7223. The master gear 7221 has a conductor track 7222 on the under surface which is to control the power of the card reader as will be explained below. The master gear 7221 is mounted on the shaft 7211 so as to pivot with the knob 7210. The slave gear 7223 is mounted on the shaft 7232 so as to drive the hook 7233 to pivot. In operation, the knob 7210 is firstly in the unlocked position, and the hook 7233 is received by the elongated aperture 1137 of the corresponding aperture on the housing of the electronically identifying apparatus. Then the knob 7210 is turned to the locked position, and the hook 7233 is turned at an angle from the elongated aperture 1137 so that it engages with the inner surface of the corresponding housing. To release the card reader, the knob 7210 is turned back to the unlocked position, and the hook 7233 is turned back and in alignment with the elongated aperture 1137.

The mother board of card reader 7000 comprises a PCB, a central operating unit 7350, a group of batteries, and a pair of spring contacts 7330. The connection between the batteries and central operating unit 7350 is controlled by the switch SW as shown in FIG. 37, which is formed by the springs 7330 and the conductor track 7222 of the master gear 7221 of the fastening means. The batteries are connected when both the springs 7330 engage the track 7222 in a locked position. The batteries are disconnected when either of the springs 7330 disengages from the conductor track 7222 of the lock means in an unlocked position. The central operating unit 7350 includes a microcontroller IC1 as shown in FIG. 37, which is programmed to provide demodulation and modulation for the data between a portable electronic device and the contact smart card. The microcontroller IC1 further provides clock and control for the contact smart card.

The interface to a portable electronic device includes an audio IO port 7370 shown as CON2 in FIG. 37 and a Bluetooth module 7400 shown as IC2 in FIG. 37. The audio IO port 7370 is to use a jack plug to connect to a cordless phone or a cell phone that has a headphone socket. The Bluetooth module IC2 is to connect the card reader with a cellular phone or computer that has Bluetooth connectivity and will exchange the voice-encoded data between the card reader and the cellular phone or PC. The Bluetooth module and the audio port may be switchable.

The interface to users includes a LCD display panel 7123 and a speaker SP as shown in FIG. 37. The LCD display panel is to provide the users with visual indication of the examination results, and the speaker SP is to deliver the audio announcement of the examination results.

Referring now to FIG. 1, FIG. 33-37 there is illustrated a modified contact smart card reader 7005. The card reader comprises a housing, a mother board, an interface to the contact smart card, an interface to users and an interface to a portable electronic device.

In modification, The interface to contact smart card has a SIM card adaptor 7320 and a switch shown as SW in FIG. 37. The SIM card adaptor 7320 has a base plate 7322 and a plurality of spring contacts 7321 and a plurality of elongated grooves 7325. The elongated grooves 7325 to provide compartments for the spring contacts 7321. Lateral movement of spring contacts 7321 is therefore retarded. Each of the spring contacts 7321 is L-shaped and has an elbow 7323 on the stem thereof to facilitate the connection with the corresponding contacts on the contact smart card. The switch SW comprises a U-shaped spring contact 7341 connected with the batteries, and a fixed contact 7342 connected with the rest circuit of the card reader. One of the arms of the contact 7341 is fixed on the plate 7322, and the other arm is transversely moveable with respect to the plate 7322. There is a ramp protrusion 7343 that extends outwardly on the moveable arm. In normal state, the moveable arm of the spring contact 7341 is biased apart from the fixed contact 7342 so that the batteries are disconnected from the rest of the circuit.

Figure 18:
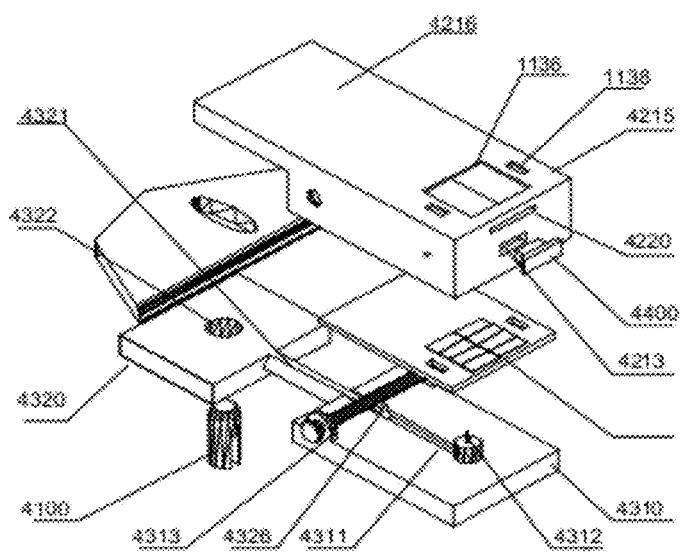
FIG. 18 illustrates a cut-away perspective exploded view of the electronic tamper-evident clamp.
Figure 19:
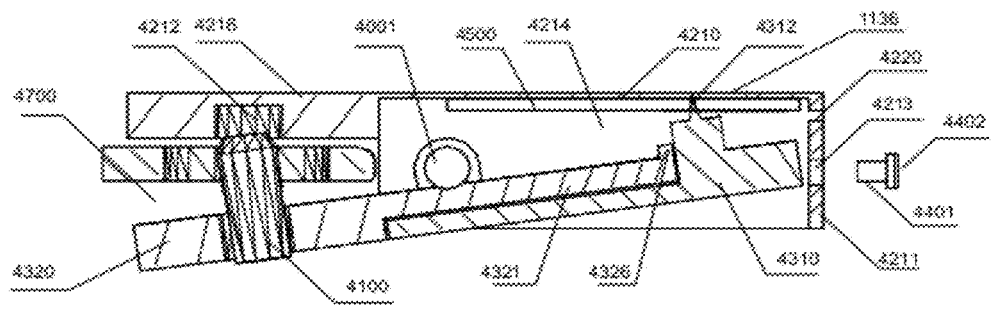
FIG. 19 illustrates a sectional view of the electronic tamper-evident clamp in an unlocked position.

The interface to contact smart card further has a fastening means comprises a spring plate 7365, ridges 7361 and a foot 7324. The spring plate 7365 has a elongated opening 7364 to provide a channel for prong 4312 to travel along when inserted into slot 4220 as shown in FIG. 18. The spring plate 7365 is fixed on the base plate 7322 at one end, and covers the extent to which the spring contacts 7321 are disposed along the surface of base plate 7322. The spring plate 7365 has ramps 7366 at moveable end to facilitate the insertion thereof into slot 4220. The ridges 7361 and a foot 7324 extend from the base plate 7322 towards the spring plate 7365. Each of the ridges 7361 has a ramp 7362 to facilitate insertion of card reader. When the card reader is inserted into an electronic identifying apparatus, the spring plate 7365 is received by the slot 4220, the ridges 7361 are forced by the spring plate 7356 to engage with the apertures 1138 so that the transverse movement of card reader is retarded. In the meantime the outer surface of electronic identifying apparatus urges the ramp protrusion 7343 inwardly so that the moveable arm of the U-shaped spring contact 7341 engages the fixed contact 7342 to form an electrical loop to connect the batteries to the rest of the circuit. The foot 7324 to define an indication of completed insertion of the card reader. The spring plate 7365 has a elongated opening 7364 extends from moveable end thereof to provide a channel for prong 4312 to travel along when inserted into slot 4220 as shown in FIG. 18.

Although the present invention has been shown and described with respect to exemplary embodiments, those skilled in the art will recognise that the present constructions, products and methods are capable of many modifications and variations, without departing from the scope of the invention which is set forth in appended claims.

What is claimed is:

1. An apparatus for electronically identifying an item, comprising:
    a contact smart card having an insulating board, an integrated circuit and a reader interface, said integrated circuit and said interface being mounted on said insulating board,
    a housing having a faceplate, a cavity for mounting said contact smart card and a opening on said faceplate for receiving a SIM card adaptor,
    a locking means having a U-shaped spring being mounted on the inner surface of said housing and a catch mounted on a moveable part of the item, said spring having a moveable arm with a hook and a ramping protrusion, said catch having a plate with a opening, said hook being biased to engage with said opening of said catch so as to prevent moveable part from movement with respect to the item, and
    a disabling means including a base plate and a blade perpendicular to said base plate with the cutting edge towards to said integrated circuit of said contact smart card, and
    a releasing means having an operating portion including a handle and a cam, said operating portion rotatable with respect to said housing between a locked position and an unlocked position, turning said operating portion drives said disabling means to move transversely from a first position to a second position where said disabling means urges said hook of said locking means to disengage from said catch, said blade of releasing means fractures said contact smart card,
    whereby said contact smart card stores the information of the item and said housing is mounted on the item.

2. An apparatus as recited in claim 1, wherein contact smart card having a reader interface including a plurality of contacts for exchanging data with and receiving power, clock and control from a card reader.

3. An apparatus as recited in claim 1, wherein the housing includes a plurality of elongated apertures on said faceplate for engaging a fastening means of the card reader.

4. An apparatus as recited in claim 1, wherein the housing includes a slot for engaging a fastening means of the card reader.

5. An apparatus as recited in claim 1, wherein the housing further includes a keyway on said faceplate.

6. An apparatus for identifying an item, includes:
    a contact smart card having an insulating board, an integrated circuit and a reader interface, said integrated circuit and said interface being mounted on said insulating board,
    a housing having a faceplate, a cavity for mounting said contact smart card and a opening on said faceplate for receiving a SIM card adaptor, whereby said contact smart card stores information of said item and said housing is mounted on said item, and
    a locking means having a latch bolt, a spring and a catch, said latch bolt and said spring mounted on and transversely moveable with respect to the item, said catch mounted on a moveable part of the item, said latch bolt biased by said spring to engage with said catch so as to prevent said moveable part from movement with respect to the item,
    a disabling means including a base plate and a blade perpendicular to said base plate with the cutting edge towards to said integrated circuit of said contact smart card,
    a releasing means having an operating portion including a handle and a cam, said operating portion rotatable with respect to said housing between a locked position and an unlocked position, turning said operating portion drives said disabling means to move transversely from a first position to a second position where said disabling means urges said latch bolt of said locking means to disengage from said catch, said blade of releasing means fractures said contact smart card.

7. An apparatus as recited in claim 6, wherein said disabling means including a base plate and a blade perpendicular to said base plate, said base plate having a keyway.

8. An apparatus as recited in claim 6, wherein said releasing means having a key including a holding head and a flat shaft, said key is received by said keyway of said disabling means and said housing and rotatable with respect to said housing between a locked position and an unlocked position, turning said key urges said disabling means to move transversely from a first position to a second position where said base plate of disabling means urges said spring of said locking means to disengage said hook of said locking means from said catch of said locking means and said blade of releasing means fractures said contact smart card.

9. An apparatus for electronically identifying an item, comprising:
 a contact smart card having an insulating board, an integrated circuit and a reader interface, said integrated circuit and said interface being mounted on said insulating board,
 a clamp having a first lever arm, a second lever arm and a fulcrum, said first lever arm and said second lever arm pivoting about said fulcrum between a locked position and an unlocked position, said first lever arm having a jaw portion and a handle portion including a faceplate and a skirt extending towards said second lever arm so as to define a cavity for receiving said contact smart card, said second lever having a jaw portion and a handle portion, said jaw portion of said first lever arm and said jaw portion of said second lever arm defining an opening for receiving the item to which the apparatus to be secured,
 a locking means having a recess on said jaw portion of said first lever aim, a through-hole on said jaw portion of said second lever arm in alignment with said aperture on said first lever arm, and a latch bolt received by said through-hole and said aperture of said first lever arm in said lock position, and
 a disabling means having a prong extending from said second lever arm towards said integrated circuit of said contact smart card,
 whereby contact smart card stores the information of said item, said latch bolt of said locking means locking said item in said locked position, said first lever arm moving with respect to said second lever arm to said unlocked position so that said latch bolt of said locking means releases said item, said disabling means fractures said contact smart card.

10. An apparatus as recited in claim 9, wherein the contact smart card having a reader interface including a plurality of contacts for exchanging data with and receiving power, clock and control from a card reader.

11. An apparatus as recited in claim 9, wherein the clamp further includes an opening disposed on said first lever arm to receive a SIM card adapter of the card reader, said first lever arm further including a plurality of apertures adapted for engaging the card reader.

12. An apparatus as recited in claim 9, wherein the clamp further includes a slot disposed on said handle portion of said first lever arm for engaging the card reader.

13. An apparatus as recited in claim 9, wherein the jaw portion of said second lever arm of said clamp having an extension arm, the handle portion of said second lever having a groove for receiving said extension arm so that said jaw portion is extendable with respect to said handle portion in unlocked position.

14. An apparatus as recited in claim 9, wherein said locking means further comprises a cotter and a slot, said slot disposed on the side surface of said second lever arm and intersected with said through-hole, said cotter received by said slot and engaging said latch bolt so as to retard axial movement of said latch bolt.

15. An apparatus as recited in claim 9, further includes a safety mechanism having a safety plug, a slot disposed on said side wall of said first arm, said safety plug being inserted into said slot and engaged with said second arm so as to prevent inadvertent movement between said first lever arm and said second lever arm.

16. A card reader, comprising:
 A housing having a base plate and a cover, said base plate engages said cover to form a chamber,
 an interface to the contact smart card having a SIM card adaptor to provide physical connections to said contact smart card, a fastening means for securing an apparatus for electronically identifying an item and a switch interlocking with said fastening means,
 an interface to users having an optical device and an acoustic device for indicating the operation status of said reader,
 a central operating unit having a plurality of electronic devices mounted on a PCB plate for converting the communication protocol defined by said contact smart card to a communication protocol defined by a handheld phone set, and providing power, clock and controls to said contact smart card, and
 an interface to a portable electronic device having a plurality of electromagnetic components to provide physical connections there between,
 whereby said card reader provides a means for a remote device to examine the information stored in contact smart card, and delivers the result of the examination to users.

17. A card reader as recited in claim 16, wherein said fastening means of said interface to said contact smart card including a handle being twisted between a locked position and a unlocked position, and a plurality of bolts for securing said reader on the corresponding tamper-evident apparatus and a transmission means for coupling the movement of said handle to said bolts, said fastening means further including an interlocking switch for turning on the power of said card reader in said locked position and turning off said power in an unlocked position.

18. A card reader as recited in claim 16, wherein said SIM card adaptor having a plurality of spring contacts and a base plate, each of said spring contacts having a ramping protrusion for engaging said contact smart card, said plate further having a plurality of elongated grooves for separating said spring contacts from each other, said fastening means having a spring plate with one end being fixed on said base plate, said spring plate extending along with said spring contacts for engaging the slot disposed on said apparatus, said fastening means further having ridges extending from said base plate towards said spring plate for engaging the apertures disposed on said face plate of said apparatus, said fastening means further having a foot for defining completed engagement between said card reader and said apparatus, said switch having a fixed contact and a moveable contact biased by a spring to be spaced apart from said fixed contact, said moveable contact having a ramping protrusion may be urged to engage with said fix contact by the apparatus that the card reader is secured.

19. A card reader as recited in claim 16, wherein said interface to the portable electronic device including an audio IO port.

20. A card reader as recited in claim 16, wherein said interface to the portable electronic device including a Bluetooth module.

* * * * *